No. 634,152. Patented Oct. 3, 1899.
J. P. SWIFT.
KNOT TYING IMPLEMENT.
(Application filed Mar. 28, 1898.)

(No Model.)

WITNESSES:
Harry J. Garceau
John S. Lynch

INVENTOR:
John P. Swift
S. Scholfield.
BY                     ATTY.

THE NORRIS PETERS CO., PHOTO-LITHO., WASHINGTON, D. C.

UNITED STATES PATENT OFFICE.

JOHN P. SWIFT, OF WOODS HOLL, MASSACHUSETTS, ASSIGNOR OF ONE-HALF TO THE EASTON & BURNHAM MACHINE COMPANY, OF PROVIDENCE, RHODE ISLAND.

KNOT-TYING IMPLEMENT.

SPECIFICATION forming part of Letters Patent No. 634,152, dated October 3, 1899.

Application filed March 28, 1898. Serial No. 675,501. (No model.)

*To all whom it may concern:*

Be it known that I, JOHN P. SWIFT, a citizen of the United States, residing at Woods Holl, in the county of Barnstable and State of Massachusetts, have invented an Improvement in Knot-Tying Implements, of which the following is a specification.

In tying the spooler's knot in factories the operatives are liable to leave the projecting ends of the thread or yarn of such a length as to cause serious breakage of the warp-threads; and it is the object of my invention to provide a hand-operated implement whereby the operator can readily tie the knot and have the projecting ends cut off with certainty to the desired length; and it consists in the combination of opposing jaws and cutting means, with suitable handles for the thumb and fingers of the operator, as hereinafter set forth.

Figure 1:
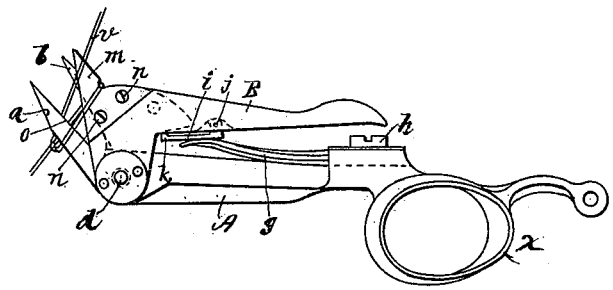
Figure 2:
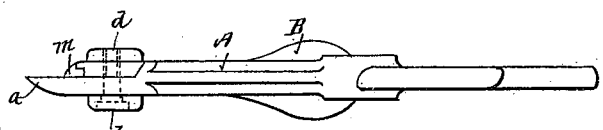
Figure 4:
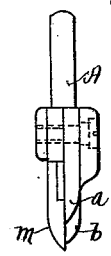
Figure 3:
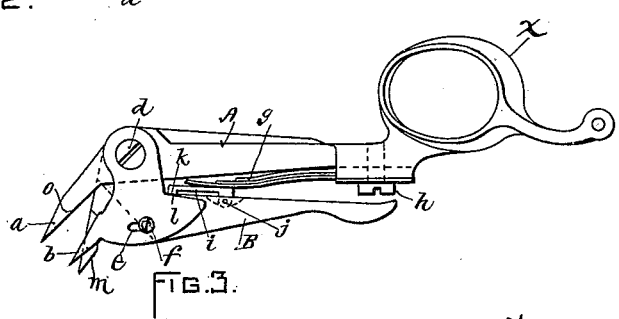
Figure 7:
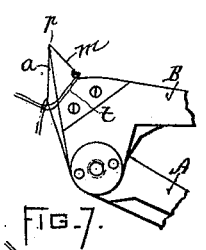
Figure 5:
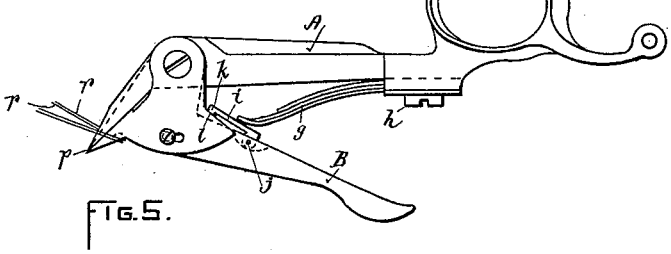
Figure 8:
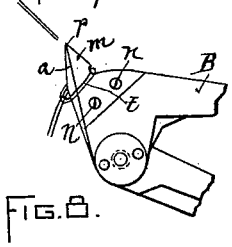
Figure 6:
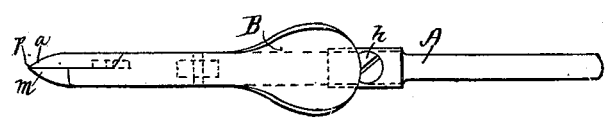
Figure 9:
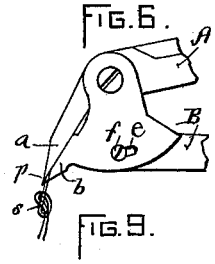

In the accompanying drawings, Figure 1 represents a side view of my improved knot-tying implement, the jaws being shown in their opened position and illustrating the third step in tying the knot. Fig. 2 represents an under edge view. Fig. 3 represents a side view, the reverse inner edge of that shown in Fig. 1, the holding-jaws being turned to a downward position. Fig. 4 represents a forward end view in the position shown in Fig. 3. Fig. 5 represents a side view, as shown in Fig. 5, with the jaws in their closed position to form the beak and illustrating the first step in tying the knot. Fig. 6 represents a top edge view taken in the position shown in Fig. 1 with the beak formed as in Fig. 5. Fig. 7 is a detail view illustrating the second step in tying the knot. Fig. 8 is a detail view illustrating the fourth step in tying the knot, the severed threads having been slightly removed from the beak of the implement. Fig. 9 is a detail view illustrating the fifth step in tying the knots.

In the drawings, Fig. 1, $a$ represents the stationary jaw, which is formed by an extension of the finger-lever A, while the movable jaw $b$ is jointed to the lever A at the screw $d$ and provided with the slot $e$, adapted to receive the screw $f$, which is carried by the thumb-lever B and forms a stop for the movement of the jaw $b$, the said thumb-lever being also pivoted to the finger-lever A by means of the screw $d$. To the inner edge of the finger-lever A is secured the leaf-spring $g$ by means of the screw $h$, and to the inner edge of the thumb-lever B is pivoted the bearing-shoe $i$, which receives the action of the spring $g$, whereby the said spring will be caused to operate both upon the thumb-lever B and the movable jaw $b$, the said bearing-shoe being pivoted at $j$ to the thumb-lever B and adapted to bear at its forward end $k$ upon the edge $l$ of the movable jaw $b$. A cutter $m$ is secured to the side of the thumb-lever B by means of the screws $n\,n$, the said cutter passing closely along the cutting edge $o$ at side of the stationary jaw $a$ to sever the threads when tying the knot.

In operating to tie the knot the beak $p$, formed by the closed jaws of the implement, is first placed over the two parallel threads $r\,r$, as shown in Fig. 5, the said threads being held under light tension between the fingers of the left hand. The beak $p$ is then turned to the position shown in Fig. 7, forming a turn $t$ in the two threads around the beak. The beak is then turned to a horizontal position and the jaws opened to receive the portion $v$ of the threads, as shown in Fig. 1, and the closure of the jaws when in this position will operate to first seize the thread between the jaws and thereafter the continued forward movement of the cutter $m$ to contact with the cutting edge $o$ of the jaw $a$ will sever the threads while they are held by the jaws, as shown in Fig. 8. The beak $p$ of the implement is then turned to the opposite position and the turn $t$ of the threads drawn off from the beak, thus completing the knot $s$, as shown in Fig. 9, the severed end of the threads being still held by the jaws.

The finger-lever A is provided with an eye or opening $x$, adapted to receive one of the fingers, preferably the third finger, thus leaving the thumb and forefingers free for use, while the implement is held in the hand of the operator with safety. The attachment of the implement to the fingers, while the thumb and forefingers are left free for use in ordinary work, is a desirable feature of my improvement, whereby the implement is rendered instantly available at all times, which would not be the case if the implement was liable to shift its position in the hand, and thus disconcert the operator in its use.

I claim as my invention—

In a knot-tying implement, the combination of the finger-lever provided with the holding-jaw, the thumb-lever pivoted to the finger-lever and provided with the cutter for operation at the side of the jaw of the finger-lever, the pivoted holding-jaw at the side of the thumb-lever, the spring connected with the finger-lever, and means whereby the pivoted holding-jaw and the thumb-lever are both actuated by the said spring, substantially as described.

JOHN P. SWIFT.

Witnesses:
SOCRATES SCHOLFIELD,
WALTER N. COE.